Dec. 17, 1963   J. C. NEITZEL ETAL   3,114,613
MATERIAL DRYING APPARATUS
Filed June 23, 1960   2 Sheets-Sheet 1
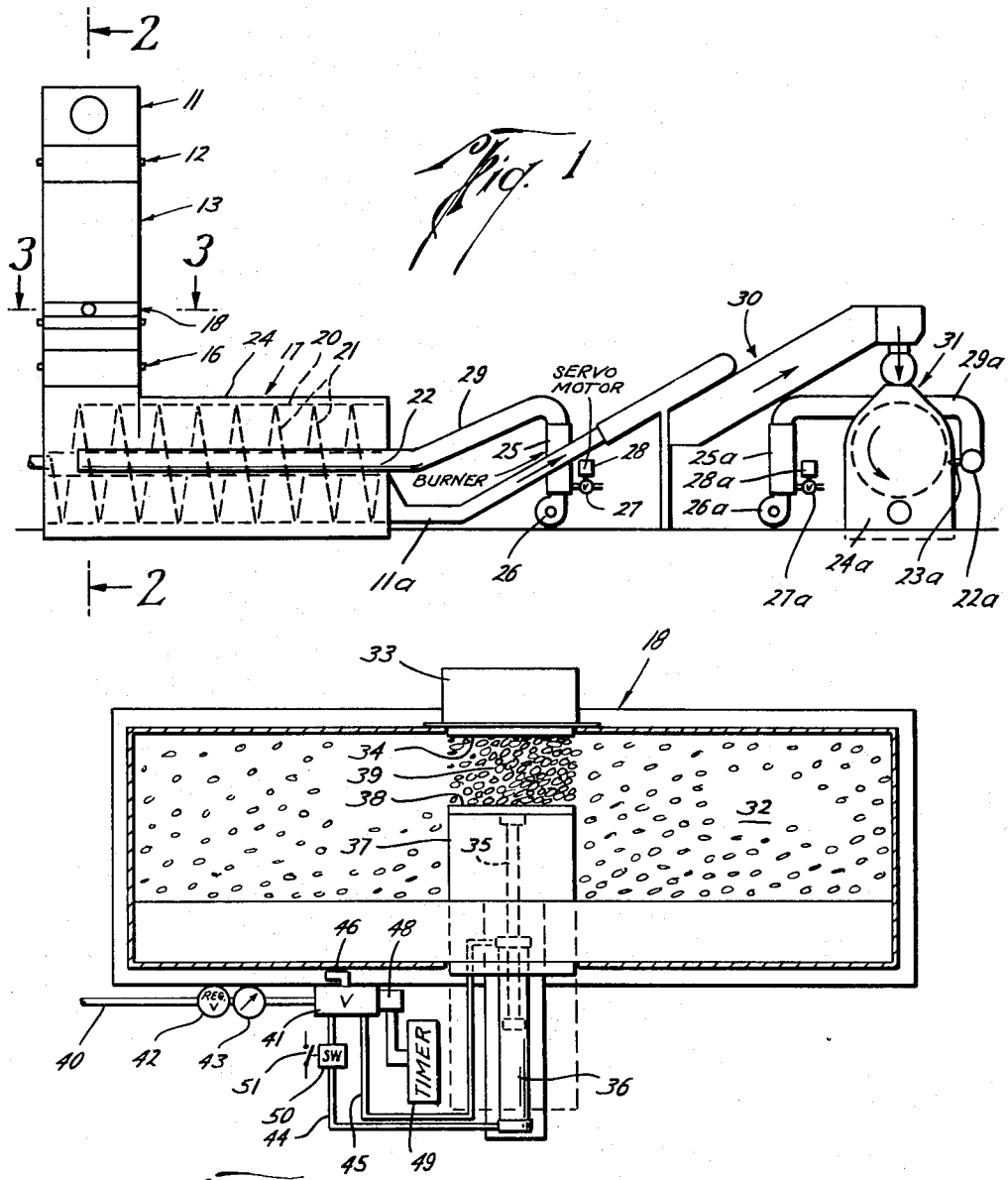
Joseph C. Neitzel
Joseph T. Laney
James A. Nelson Jr.
INVENTORS
BY
Robert A. White
ATTORNEY Dec. 17, 1963  J. C. NEITZEL ETAL  3,114,613
MATERIAL DRYING APPARATUS
Filed June 23, 1960  2 Sheets-Sheet 2
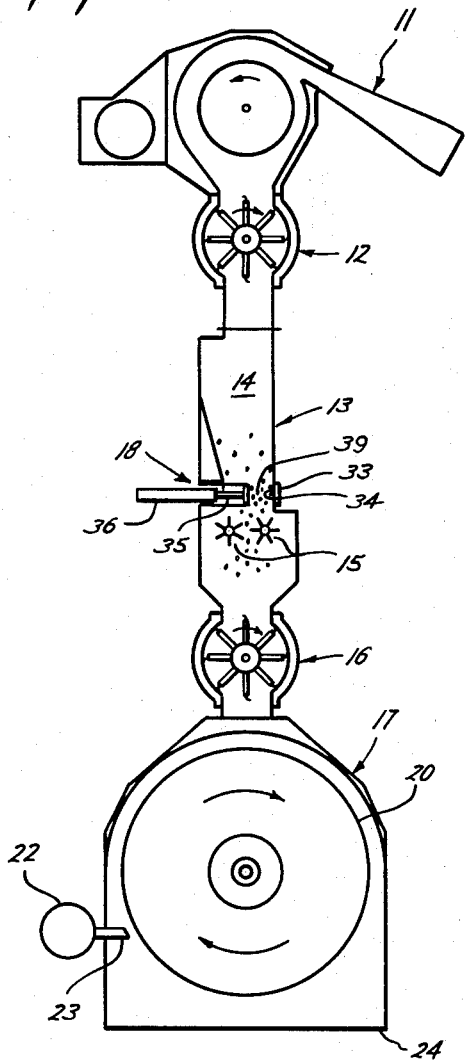
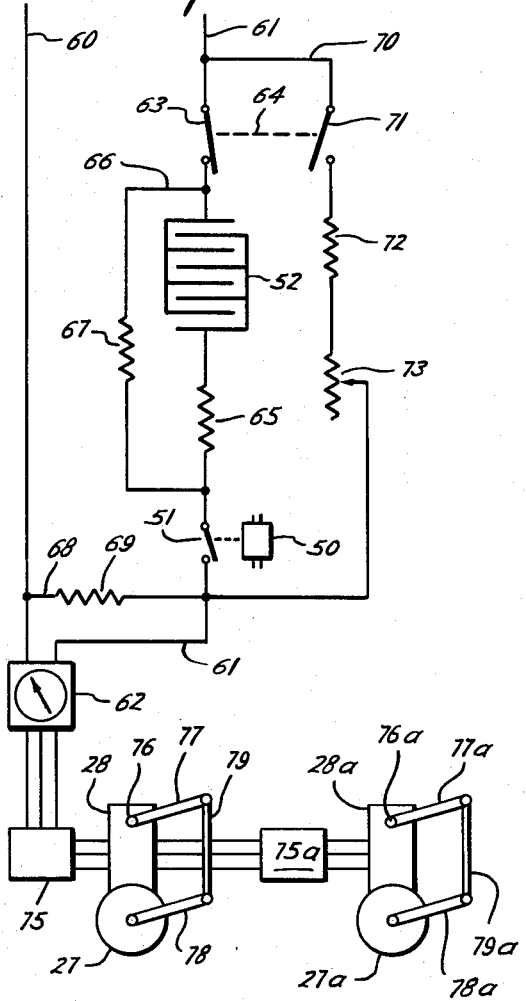
Joseph C. Neitzel
Joseph T. Laney
James A. Nelson Jr.
INVENTORS
BY
Robert A. White
ATTORNEY

United States Patent Office 3,114,613
Patented Dec. 17, 1963

3,114,613
MATERIAL DRYING APPARATUS
Joseph C. Neitzel, Dallas, Tex., Joseph T. Laney, Memphis, Tenn., and James A. Nelson, Jr., Dallas, Tex., assignors to The Murray Company of Texas, Inc., Dallas, Tex., a corporation of Delaware
Filed June 23, 1960, Ser. No. 38,227
3 Claims. (Cl. 34—48)

Our present invention relates to drying apparatus which measures the moisture content of the material to be processed, converts such measurement into positive adjustments of heat supply means, and communicates the heat to the material so as to reduce the moisture content as desired. It has particular utility for reducing the moisture content of seed cotton in a gin plant.

In the art of processing seed cotton in a gin plant, it is desirable to accomplish certain operations before undertaking the actual ginning or stripping of the fibers from the seed. It is known that the ginning is most efficiently performed on seed cotton which is free of foreign matter and free of excessive moisture, and thus a conventional gin plant assembly includes one or more dryers and one or more cleaners through which the seed cotton is directed early in its processing.

Proper drying is important in ginning because the value of the cotton fibers is related to the staple length, and excessive drying tends to shorten the staple. On the other hand, insufficient drying renders the cleaning operation less efficient, and improperly cleaned cotton suffers a reduction in value. Experience has indicated that the optimum moisture content of cotton at the time of delivery to the ginning equipment for maximum staple and most effective cleaning and ginning is approximately 5% by weight, i.e., 5 pounds of water in 100 pounds of seed cotton.

It has been the practice for the gin plant operator to inspect the seed cotton in its delivered condition and estimate from its feel and appearance the amount of heat which must be supplied for drying. Based on this initial estimate, an appropriate setting of the heat supply means for the dryer or dryers is made, such setting usually being a manual adjustment of a fuel supply valve which controls the rate at which a combustible fuel is supplied to a heater. Thereafter, periodic inspections of the cotton at its points of entry to and exit from the drying and cleaning apparatus are made to determine the accuracy of the initial setting and to form a basis for subsequent readjustment of the heat supply means.

It is obvious that the conventional method involving frequent visual inspections and manual adjustments not only lacks in precision and leads to non-uniform drying, but also requires almost constant care from an operator whose attention is divided among the several items of equipment involved in ginning. As a practical matter, too little attention is given this phase of processing, and the value of the cotton suffers accordingly. Prior art drying equipment, in which the material has been conveyed to and through the oven on a conveyor belt, is not applicable to a gin plant wherein the seed cotton, customarily, is transported through flues, by gravity or compressed air action, to provide adequate capacity and to avoid excessive compression of the bolls and locks and damage to the seed prior to handling by the drying, cleaning, and ginning machinery. Therefore, it is a primary object of our invention to provide an interrelated assembly of drying equipment particularly adaptable to seed cotton and including moisture measuring apparatus and heat supply adjusting apparatus to measure the moisture content of incoming material and convert such measurement into an adjustment of the rate at which heat is supplied for drying.

It is a more specific object of our invention to provide apparatus to measure the moisture content of seed cotton as it falls through a controlled feed duct or collecting chamber and automatically adjust a fuel supply valve in accordance with such measurement.

It is also an object of our invention to provide a moisture measuring element which is adapted to select at frequent timed intervals a representative sample of moist seed cotton and quickly and accurately determine the moisture content thereof.

It is also an object of our invention to provide a moisture measuring element which is adapted to measure the electrical resistance of a representative sample of incoming seed cotton and communicate its measurement to heat supply means in terms of an electrical signal, the character of which varies with the moisture content of such sample.

It is a further object of our invention to provide actuating and timing means for the moisture measuring element which will briefly actuate the element to make a moisture measurement at preselected intervals of time.

It is a further object of our invention to provide means in connection with the moisture measuring element to allow transmission of the electrical signal indicative of the moisture content of the seed cotton only when consistent and uniform conditions of measurement exist.

It is also an object of our invention to provide a primary heat control system for seed cotton drying apparatus which will receive an electrical signal indicative of the moisture content of the cotton and convert it into a setting of the heat supply means in accordance with the strength of the signal.

It is also an object of our invention to provide supplementary heat control systems associated with the primary heat control system to adjust additional heat supply means for additional drying apparatus whereby moisture removal can be accomplished in multiple stages, the operation of each of which is directly correlated with the moisture content of the incoming cotton.

It is also an object of our invention to provide manual control means for the heat control system or systems to allow setting of the heat supply means at any desired position for preheating the drying equipment.

In carrying out the foregoing objectives, we provide a moisture measuring element positioned in a conduit near the inlet to the first dryer and through which the seed cotton passes by gravity. At timed intervals, a reciprocating member moves transversely across the conduit where it exerts a force against a small representative portion of the seed cotton and moves it into contact with an electrical grid. The resistance of the cotton varies inversely with its moisture content, and with a preselected constant voltage across the grid, the voltage at the output side of the circuit varies over a convenient range determined by the limits of variation of the moisture content. Thus, the output voltage is proportional to the moisture content of the material.

During the brief measured interval of time that the cotton sample is against the grid, the signal is received by a heat control system which, through appropirate circuits, delivers it to an electrical servo mechanism connected to the gas feed valve on the heat supply means for the dryer. The servo mechanism converts the electrical signal into mechanical energy to vary the opening of the feed valve and thus the rate at which gas is supplied to the heater. At each measurement, the gas valve is adjusted to reflect the variation in moisture of the incoming cotton, and it remains in the adjusted position until the next measurement. The time required for the internal temperature of the dryer to respond to a change in setting of the gas valve is so related to the time necessary for the cotton to move through the dryer and be affected by such temperature that the seed cotton of which the measured portion is representative will be reduced to a desired moisture level. A second dryer with similar gas fed heat supply means can be added to the system and operated in a manner similar to the first heat supply means in response to the signal produced by the moisture measuring element.

Our invention can be understood by the following description studied in conjunction with the attached drawings in which:

FIGURE 1 is a schematic diagram of a typical seed cotton drying and cleaning assembly, showing two dryers with their associated heat supply means and gas feed valves, and a cleaner;

FIG. 2 is an enlarged section along line 2—2 of FIG. 1 showing the first dryer, the feed means therefor, and the moisture measuring element;

FIG. 3 is an enlarged section along line 3—3 of FIG. 1 showing the moisture measuring element and the timing and actuating means therefor, in plan view;

FIG. 4 is an electrical diagram of our moisture measuring element and the heat control system associated therewith, showing the moisture measuring grid, and the servo motor and the gas feed valves for the two dryers shown in FIG. 1.

Referring first to FIGS. 1 and 2, a typical assembly of elements for cleaning and drying cotton is shown. Reference numeral 11 indicates the conduit through which the seed cotton arrives at the drying apparatus. Seed cotton conventionally is transported pneumatically and separator 12 separates the control feed unit 13 therebelow from the moving air in conduit 11. The control feed unit 13 has a receiving chamber 14 through which the cotton moves by gravity and feed means such as vaned rollers 15 which control the rate of introduction of the cotton to the dryer. Separator 16 below the feed rollers 15 separates the control feed unit from the interior of the first dryer 17.

The feed rollers 15 pass cotton to the dryer at a rate commensurate with the capacity of the gin plant, and the cotton awaiting entry to the dryer accumulates in a substantially uniform mass in collecting chamber 14 or duct. Our moisture measuring element designated generally by reference numeral 18, to be described in detail hereinafter, is interposed above the feed rollers 15 in the chamber 14 of control feed unit 13.

Within the dryer 17 is a revolving cylinder 20, and the seed cotton travels therethrough responsive to the rotation of the spiral baffles 21 therein which act as a large screw type conveyor. The surface of the cylinder 20 is formed of a mesh or grid which allows hot air from the manifold 22 to blow through and across the cylinder to dry the seed cotton as it tumbles within the cylinder. The nozzle 23 extends the length of manifold 22 and directs the hot air against the cylinder 20. The imperforate housing 24 of the dryer serves as a thermal jacket to confine the hot air therewithin, and foreign material within the seed cotton falls through the apertures in the surface of the cylinder and comes to rest within the bottom of the of the housing from whence it can be conveniently collected and removed.

Connected to the manifold 22 by conduit 29 is a heating unit 25 and a blower fan 26. The fan 26 provides a flow of air which moves through the heating unit where a gas fed flame raises its temperature to a desired level. Thereafter it travels through the conduit 29 and is introduced uniformly along the length of the dryer by the manifold 22 and nozzle 23. A gas feed valve 27 on the heating unit 25 controls the rate at which gas is supplied thereto for combustion and thus the temperature of the air provided for drying purposes by the blower fan. An electrical servo motor 28 is connected to valve 27 and controls the position thereof.

As the spiral baffles 21 move the cotton to the exit point of dryer 17, it enters conduit 11a, which transfers it to a conventional inclined grid cleaner 30. As such cleaners are well known in the art, the details are not shown or described. It is necessary only to point out that the seed cotton is cleaned as it moves through the cleaner and upon its exit therefrom, it passes into the second dryer 31.

Dryer 31 is identical to dryer 17, and the associated parts including the heater with its valve and servo motor, the blower fan, conduit, manifold, and nozzle are the same. Thus, the same reference numerals employed in describing dryer 17 identify the counterpart elements of dryer 31, with the suffixed letter "a" serving to distinguish between the two.

It is to be understood that the fan and heating unit and their associated parts may be any of several conventional designs, such units being available by separate elements or in integrated assemblies. The arrangement shown merely illustrates one type of assembly which will provide the heat necessary for proper drying.

It is apparent that the location of the heater relative to the dryer is merely a matter of choice, and for purposes of compliance with various building codes or minimization of fire hazards, it may be in a separate room remote from the dryer itself. In other words, the conduit 29 may be of such length as is necessary to interconnect the heating unit and dryer.

The moisture measuring element 18, shown in detail in FIG. 3 may be located at any convenient point in the system which provides seed cotton to the first dryer. We prefer a location in the chamber 14 where a substantial amount of material may be found. The walls of the chamber define a rectangular conduit 32 through which the seed cotton moves on its way to the feed rollers 15, and an electrical grid unit 33 is fixedly mounted in one wall with its face 34 exposed to the interior of the conduit. Opposite the grid is a movable piston 35 which is driven across the conduit 32 by air or fluid pressure within cylinder 36. A rectangular member 37 is attached to the end of piston 35, and its forward face plate 38 is substantially coextensive with the exposed face 34 of grid unit 33. The face plate 38 is of an electrical insulating material, so that it will not short circuit the electrical grid in the face 34 of grid unit 33. The small sample of seed cotton trapped between plate 38 and face 34 is pressed against the latter as member 37 moves across the conduit 32, and thus a representative sample of the cotton about to enter the dryer is brought into contact with the grid unit face 34.

In the drawings, the piston 35 is in an extended position with a sample 39 of seed cotton pressed against the grid unit. It will be apparent that the trapped cotton samples 39 are caused to bear uniformly against fixed grid unit face 33. The actual pressure exerted on samples 39 need not be great, the uniformity of the pressure applied to consecutive samples being the important consideration. In a retracted position, the piston 35 and member 37 are withdrawn from conduit 32 and do not interfere with the free passage of cotton therethrough.

FIG. 3 shows the timing and actuating means which determine the position of the piston 35, member 37 and plate 38. Air or fluid under pressure is supplied from a conventional source, not shown, and passes through pressure line 40 to the four-way solenoid operated valve 41. In line 40 is a pressure regulator 42 to insure constant pressure at the valve 41 and a pressure gauge 43 for convenient inspection. When valve 41 is in a first position, pressure line 40 is placed in communication with piston extension line 44 and when valve 41 is in the second position, pressure line 40 is placed in communication with position retraction line 45. FIG. 3 reveals that line 44 is connected to the rear of the cylinder 36 and line 45 to the opposite or forward end. When one of these lines is connected to pressure line 40, the other communicates with the exhaust line 46 of valve 41.

The position of valve 41 is controlled by solenoid 48 which in turn is connected to and controlled by timer 49.

As several types of suitable timers are commercially available, the details of this element are not disclosed herein. Any unit which will, at preselected intervals, energize the solenoid 48 to direct the valve 41 to its first position for a period of time sufficient to allow the piston 35 to extend and press a sample of seed cotton against the grid unit, and thereafter de-energize the solenoid to return the valve to its second position, will serve in our invention.

For normal installation, we have found that a moisture measurement can be made in a five second period, and that 30 second intervals between measurements are sufficient for effective adjustment of the dryer. Commercial timers of the suggested type may be adjusted to vary both the time of and interval between energization periods.

It is apparent that the volume of seed cotton which is present in the conduit 32 at a given moment may vary, and thus it is necessary to allow the extension of the piston to accommodate itself to the amount of seed cotton which is present in front of the face plate 38 of the member 37. In other words, the force exerted by the piston against the body of cotton 39 between plate 38 and face 34 must be uniform, so that each moisture measurement will be made under identical conditions. A hydraulic or pneumatic system is ideally suited for this operation, for the piston will move only as far as necessary to create a uniform resistive force in the body of cotton against the grid, at which time the forces balance and the piston stops. At present we provide a pressure of approximately 20 p.s.i. in the piston actuating system, which pressure is sufficient to compact the seed cotton for effective measurement without damaging the seed or disadvantageously affecting subsequent cleaning or ginning operations.

In line 44 is a pressure switch 50 which has a normally open contact 51 in the heat control system for the dryers, to be described hereinafter. At this point it is necessary to point out only that switch 50 closes contact 51 when the pressure in line 44 is almost equal to the system operating pressure. Thus, when valve 41 moves to its first position to direct pressure fluid through piston extension line 44, the pressure in line 44 will not reach system pressure until the piston has reached the full extension permitted by the body of cotton 39 in front of the plate 38. At this time the cotton is in position for its moisture content to be measured, and the switch 50 closes contact 51 to allow the signal from the grid unit to reach the heat control system. As soon as the measuring period is terminated by timer 49, and solenoid 48 moves valve 41 to its second position, the line 44 is relieved through exhaust port 46, and the pressure switch 50 opens contact 51. In this manner, the heat control system is prevented from receiving and responding to signals produced by the grid unit during the period that cotton is not compressed thereagainst.

FIG. 4 illustrates the heat control system which we presently employ in our invention. An electrical grid 52 is located in the face 34 of the grid unit 33. The grid comprises a series of closely spaced exposed conductors. The gaps therebetween are bridged by the seed cotton thereagainst, and the electrical resistance of the grid will vary with the moisture of the cotton.

The pressure switch contact 51, gas feed valves 27 and 27a, servo motors 28 and 28a, and the electrical circuits and apparatus which interconnect all of these elements to produce proper operation thereof are shown schematically. Power for the system is provided by a conventional sources adapted to impress a D.C. voltage across the conductors 60 and 61 which are connected to a null balancing potentiometer indicator unit 62 of a type similar to the Wheelco series 3000–2517X. Conductor 61 includes one contact 63 of a single pole double throw selector switch 64, the grid 52, a resistor 65 and the contact 51 of pressure switch 50. Conductor 66 connects a relatively large fixed resistor 67 in parallel with the grid 52 and resistor 65, and the conductor 68 places resistor 69 in parallel with the indicator unit 62. Those proficient in the art of electrical design can readily select a convenient voltage and proper values for the resistances of resistors 65, 67 and 69 to produce the desired sensitivity of the grid. We prefer to employ a 12 volt D.C. source and to select resistances which will result in a variation of the output voltage from .002 volt at approximately 6% moisture in the measured seed cotton to approximately .5 volt at a moisture level of 15%.

Conductor 70 establishes a circuit in parallel with the grid 52 and the pressure switch contact 51, the purpose of which is to provide a manually controlled means for preheating the dryer independently of the resistance across the grid. In this circuit is the second contact 71 of switch 64, a fixed resistor 72 and a variable resistor 73. When switch 64 is moved to its second position, contact 63 is opened to de-activate the grid circuit, and contact 71 is closed to energize the circuit therethrough. With proper selection of the fixed resistor 72, and a proper range of adjustment in variable resistor 73, any desired resistance across the grid 52 can be duplicated by setting of the latter, whereupon the elements of the heat control assembly will respond accordingly.

The function of pressure switch 50 has been described previously. At the indicated position in the control circuit, its contact 51 will prevent a signal from reaching the indicator unit 62 except when a body of seed cotton is properly positioned against the grid. However, when the switch 64 is in its second position, a signal will reach the indicator unit even though contact 51 of switch 50 is open. With switch 64 in the second or manual control position, the timer 49 can be cut off to halt operation of reciprocating member and grid assembly.

The foregoing description makes it clear how an electrical signal which varies in strength is communicated at intervals to the indicator unit 62. When such a signal reaches the null balancing potentiometer, commonly called a slide wire, of the indicator, its magnitude is indicated by a movable pointer which travels across an arbitrary scale calibrated for the particular installation. Thus a visual indication of the moisture reading is provided for the convenience of the operator.

The indicator unit 62 is joined by suitable conductors to a transistor relay 75 and the servo motor 28 for gas feed valve 27. The transistor relay is a polarized relay designed for use in self balancing bridge circuits. We prefer a unit such as the Barber Coleman AE 339A or equivalent. Servo motor 28 may be a Wheelco series 35–179 Power Unit or equivalent, a device which has a reversible motor with a potentiometer or slide wire mounted on the output shaft. As will be apparent to one skilled in the art, the transistor relay provides a link between the controlling device, indicator unit 62, and the controlled device, servo motor 28. A change in position of the potentiometer in the indicator unit causes an unbalance in the bridge circuit to the servo motor potentiometer. This unbalance is detected by the transistor relay which makes a contact causing the motor in the power unit to rotate in the proper direction to rebalance the circuit. As the details of the commercially available items employed in our invention are well known, the precise circuitry is not shown in the drawings nor described herein.

The output shaft 76 of servo motor 28 bears an arm 77 which is connected to the operating arm 78 of valve 27 by a link 79. One end position of the path of rotation of the output shaft corresponds to the "full closed" position of the valve, and the other end position is the "full open" position of the valve. Thus if the signal received by the indicator unit 62 indicates that the measured seed cotton has a moisture content of 5%, the indicator unit-servo mechanism bridge circuit will balance itself through rotation of the shaft 76 to the end position which closes the gas valve. If the moisture reading indicates a moisture content equal to or in excess of 15%, the necessary circuit rebalancing will place the gas valve in its full open position. Within these limits, the intermediate positions of the valve will be directly controlled by the moisture of the cotton. Obviously, the system is quite flexible and the adjustment of the operating limits will depend in some measure on the characteristics of each installation. However, it will be relatively simple for a competent operator to calibrate the system disclosed herein for the requirements of a given gin plant.

In the FIG. 1 installation where two dryers are employed, the second gas valve 27a can be added to the automatic heat control system by connecting the potentiometer of servo motor 28 to the potentiometer of servo motor 28a through a second transistor relay 75a. This circuit will balance itself in the same manner as the primary heat control circuit, and affords a convenient method for controlling several dryers with one moisture measuring element.

When two dryers are employed, it is preferable that the temperature of the second be somewhat less than that of the first. Thus, the signal which places the valve 27 in a full open position ideally would place the valve 27a in some intermediate position as dictated by the needs of the particular installation. This proportioning of the two valves can be accomplished by adjustment of the link 79a which connects servo motor 28a to valve 27a, so that full rotation of the output shaft 76a produces only a half opening of the valve.

Alternatively, the electrical circuit interconnecting servo motor 28 and servo motor 28a may be modified by placing a resistor in series connection with the potentiometer of servo motor 28a. The balancing movement will be inversely proportional to the ratio of the total resistance of the second potentiometer to that of the first, so the movement of the second power unit will be reduced accordingly.

Although we have chosen to illustrate and describe the presently preferred embodiment of our invention, it is apparent that many obvious modifications will occur to one skilled in the art, and the following claims are intended to encompass all such modifications as fall within their scope.

We claim:
1. Apparatus for controlling the moisture content of seed cotton comprising a drier casing, means for conducting cotton through said casing, heater means for said casing and a control for said heater means, a downwardly disposed feed duct for supplying cotton by gravity to said casing, control means for maintaining a substantially uniform mass of cotton in said duct, spaced electrodes fixed within said duct in position to be contacted and bridged by cotton therein and passing therethrough, means for supplying electrical current across said electrodes and cotton contacting the same, means for sensing the electrical resistance and moisture content of said electrode contacting cotton, and control means for said heater operatively connected to said resistance sensing means for adjusting said heater accordingly.

2. Apparatus for preparing seed cotton for ginning comprising a drier casing having an inlet and an outlet, means for propelling cotton through said casing, a heater for said casing and a control for said heater, a seed cotton cleaner connected to said casing outlet for receiving cotton therefrom, a downwardly disposed feed duct for delivering cotton by gravity to the inlet of said casing, spaced electrodes fixed in said duct and positioned to be contacted and bridged by the cotton in and passing through said duct, means to cause the cotton to bear substantially uniformly against said electrodes, circuit means to subject said electrodes and bridging cotton to an electrical current, means to sense variation of electrical resistance in said circuit means and, thereby, the moisture content of the electrode bridging cotton, and means operatively connecting said sensing means and said heater control for adjusting said control in accordance with the moisture content of the cotton in said duct and to prepare the cotton for delivery to said cleaner for subsequent ginning.

3. Apparatus for controlling the moisture content of seed cotton comprising a drier casing, means for conducting cotton through said casing, heater means for said casing and a control for said heater means, a downwardly disposed feed duct for supplying cotton by gravity to said casing, control means for maintaining a substantially uniform mass of cotton in said duct, spaced electrodes fixed within said duct in position to be contacted and bridged by cotton therein and passing therethrough, a reciprocating plunger member mounted adjacent said electrodes, means for intermittently propelling said plunger member toward said electrodes for forcing selected samples of cotton being fed through said duct more intimately against said electrodes and thereby facilitating the sensing of the resistance characteristics and moisture content thereof, means for supplying electrical current across said electrodes and cotton contacting the same, means for sensing variations in the electrical resistance and moisture content of the electrode contacting cotton, and control means for said heater operatively connected to said resistance sensing means for adjusting said heater accordingly.

References Cited in the file of this patent

UNITED STATES PATENTS

| | | |
|---|---|---|
| 2,653,298 | McKinley | Sept. 22, 1953 |
| 2,822,153 | Arnold | Feb. 4, 1958 |
| 2,852,740 | Posey et al. | Sept. 16, 1958 |
| 2,940,040 | Rosenthal | June 7, 1960 |

UNITED STATES PATENT OFFICE
CERTIFICATE OF CORRECTION

Patent No. 3,114,613                          December 17 1963

Joseph C. Neitzel et al.

It is hereby certified that error appears in the above numbered patent requiring correction and that the said Letters Patent should read as corrected below.

Column 4, line 69, for "position" read -- piston --; column 6, line 48, for "339A" read -- 399A --.

Signed and sealed this 19th day of May 1964.

(SEAL)
Attest:
ERNEST W. SWIDER

Attesting Officer

EDWARD J. BRENNER
Commissioner of Patents